(12) United States Patent
Fesi

(10) Patent No.: US 10,800,674 B1
(45) Date of Patent: *Oct. 13, 2020

(54) OIL SKIMMER

(71) Applicant: Michael A. Fesi, Houma, LA (US)

(72) Inventor: Michael A. Fesi, Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/219,133

(22) Filed: Dec. 13, 2018

Related U.S. Application Data

(63) Continuation of application No. 14/973,081, filed on Dec. 17, 2015, now Pat. No. 10,202,290.

(60) Provisional application No. 62/093,846, filed on Dec. 18, 2014.

(51) Int. Cl.
| | |
|---|---|
| *E02B 15/00* | (2006.01) |
| *C02F 1/40* | (2006.01) |
| *E02B 15/04* | (2006.01) |
| *C02F 101/32* | (2006.01) |
| *C02F 103/00* | (2006.01) |

(52) U.S. Cl.
CPC .............. *C02F 1/40* (2013.01); *E02B 15/046* (2013.01); *E02B 15/048* (2013.01); *C02F 2101/32* (2013.01); *C02F 2103/007* (2013.01); *C02F 2201/008* (2013.01)

(58) Field of Classification Search
USPC ...... 405/52, 60, 63, 64; 210/242.3, 776, 923
See application file for complete search history.

(56) References Cited

U.S. PATENT DOCUMENTS

| | | | | |
|---|---|---|---|---|
| 3,951,810 A | * | 4/1976 | Crisafulli | E02B 15/048 210/242.3 |
| 5,478,483 A | * | 12/1995 | Gore | E02B 15/048 210/776 |
| 5,479,869 A | * | 1/1996 | Coudon | B63B 35/28 114/26 |
| 10,202,290 B1 | * | 2/2019 | Fesi | C02F 1/40 |

* cited by examiner

*Primary Examiner* — Sean D Andrish
(74) *Attorney, Agent, or Firm* — Garvey, Smith & Nehrbass, Patent Attorneys, L.L.C.; Seth M. Nehrbass; Julie R. Chauvin

(57) ABSTRACT

An apparatus for removing oil or other pollutants from the surface of water, comprising a platform having a left side wall, a right side wall, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor; and a pump connected to the rear location that removes the oil from the rear location to a storage area which does not affect the ballast of the platform. The skimmer vessel can work stationary in the water, and does not require a propeller means, as the oil will continue to flow into the skimmer as the oil is pumped out of the rear by the gravity flow to the rear of the vessel.

20 Claims, 17 Drawing Sheets

OIL SKIMMER

CROSS-REFERENCE TO RELATED APPLICATIONS

This is a continuation of U.S. patent application Ser. No. 14/973,081, filed 17 Dec. 2015 (issued as U.S. Pat. No. 10,202,290 on 12 Feb. 2019), which claims the benefit of U.S. Provisional Patent Application Ser. No. 62/093,846, filed 18 Dec. 2014, incorporated herein by reference and priority of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to skimming devices. More particularly, this invention relates to skimming devices for removal of oil or other pollutants from the surface water.

2. General Background of the Invention

There are skimming devices in the art, however, it is desirable that a skimming apparatus be a simple device that can work stationary in the water, and does not require a propeller or pulling means for operation, and easily adjustable so that the mouth of the skimmer sits at the interface of the oil and the water. It is also desirable that a user not need to continually adjust the skimmer elevation during use.

Examples of possibly related patents directed to such devices are listed in the following table.

The following U.S. Patents are incorporated herein by reference:

TABLE

| Pat. No. | TITLE | ISSUE DATE MM-DD-YYYY |
|---|---|---|
| 3,704,784 | Floating Oil Skimmer | Dec. 5, 1972 |
| 3,730,346 | Skimming System | May 1, 1973 |
| 3,754,653 | Apparatus and Method for Collection of Oil from Surface of the Sea | Aug. 28, 1973 |
| 3,822,789 | Oil Skimmer Module with Free Floating Weir Trough | Jul. 9, 1974 |
| 3,862,904 | Boat for collecting oil slicks and other contaminants from the surface of water | Jan. 28, 1975 |
| 3,951,810 | Oil skimmer module with free floating weir trough | Apr. 20, 1976 |
| 4,208,287 | Oil spill skimmer | Jun. 17, 1980 |
| 4,477,348 | Open Sea Skimmer Barge | Oct. 16, 1984 |
| 5,043,065 | Variable draft oil/debris skimming vessel | Aug. 27, 1991 |
| 5,216,974 | Vessel for collecting and separating oil/water in a marine environment using submerged internal collection and separation | Jun. 8, 1993 |
| 5,478,483 | Oil spill skimmer with adjustable floating weir | Dec. 26, 1995 |
| 5,753,108 | Integrated oil response and recovery system and method and skimmer for use therein | May 19, 1998 |
| 6,471,862 | Oil skimming apparatus | Oct. 29, 2002 |

Incorporated herein by reference are U.S. patent application Ser. No. 13/163,196, filed 17 Jun. 2011, now U.S. Pat. No. 8,696,242, and U.S. Provisional Patent Application Ser. No. 61/355,911, filed 17 Jun. 2010. However, this is not a continuation or continuation-in-part of any patent application.

BRIEF SUMMARY OF THE INVENTION

The apparatus of the present invention includes a platform having a left side wall, a right side wall, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor, and a pump connected to the rear location that removes the oil from the rear location to a storage area which does not affect the ballast of the platform. The apparatus of the present invention also includes a spud and a spud sleeve.

Preferably, the floor is unobstructed.

Preferably, the bottom is flat.

Preferably, the level of the platform floor is variable to the consistency of the oil or pollutant on the water surface.

The apparatus can further comprise one or more propellers attached to the platform to self-propel the platform through the water.

Preferably, the apparatus further comprises a second vessel in which the oil is contained.

The apparatus can be moved by a hydraulic propeller, an outboard or a small boat.

Preferably, a vertical wall separates the ballast tanks.

Preferably, the combination of the spud and spud sleeve can stabilize the skimmer.

The apparatus of the present invention includes a platform having a left side wall, a right side wall, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor, and a pump connected to the rear location that moves the oil from the rear location to a storage area which does not affect the ballast of the platform. Preferably, there are at least 4 ballast tanks, two fore and two rear, and slightly more water can be put in the rear tanks to cause the oil to more easily flow toward the back.

The apparatus of the present invention includes a platform having a left side wall, a right side wall, a rear wall, a front opening, a floor, and a bottom, one or more ballasts which adjust the platform floor relative to a level of oil on the water surface, a rear location near the rear wall to collect the oil from the platform floor, and a pump connected to the rear location that moves the oil from the rear location to a storage area which does not affect the ballast of the platform, wherein the oil flows from the front opening across the floor to the rear wall when the front opening is below the surface of the oil.

The present invention includes an apparatus for removing oil or other pollutants from the surface of water, comprising a platform having a left side wall, a right side wall, a rear wall, a front opening, an unobstructed floor, and a flat bottom, one or more ballasts located in the platform, wherein the ballasts adjust the platform floor relative to a predetermined level of oil on the water surface, one or more propellers attached to the platform to self-propel the platform through the water, wherein the oil flows from the front opening across the floor to the rear wall as the platform is being self-propelled, a rear location near the rear wall to collect the oil from the platform floor, and a pump connected to the rear location that removes the oil from the rear location to a storage area.

Preferably, the platform floor floats right below the surface of the oil.

Preferably, the ballasts are located in the left side wall and the right side wall.

Preferably, the rear location is a box or tank.

Preferably, the pump is a hydraulic pump.

Preferably, the rear location sits at a lower elevation than the floor.

The present invention includes an apparatus for removing oil or other pollutants from the surface of water, comprising a platform having a left side wall, a right side wall, a rear wall, a front opening, an unobstructed floor, and a flat bottom, one or more ballasts located in the platform, wherein the ballasts adjust the platform floor relative to a predetermined level of oil on the water surface, one or more propellers attached to the platform to self-propel the platform through the water, wherein the oil flows from the front opening across the floor to the rear wall as the platform is being self-propelled, a rear location near the rear wall to collect the oil from the platform floor, and a pump connected to the rear location that moves the oil from the rear location to a storage area.

Preferably, the platform floor is about at the interface of the oil and the water. Preferably, the platform floor floats right below the surface of the oil. Preferably, the ballasts are located in the left side wall and the right side wall. Preferably, the rear location is a box or tank. Preferably, the pump is a hydraulic pump. Preferably, the rear location sits at a lower elevation than the floor.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
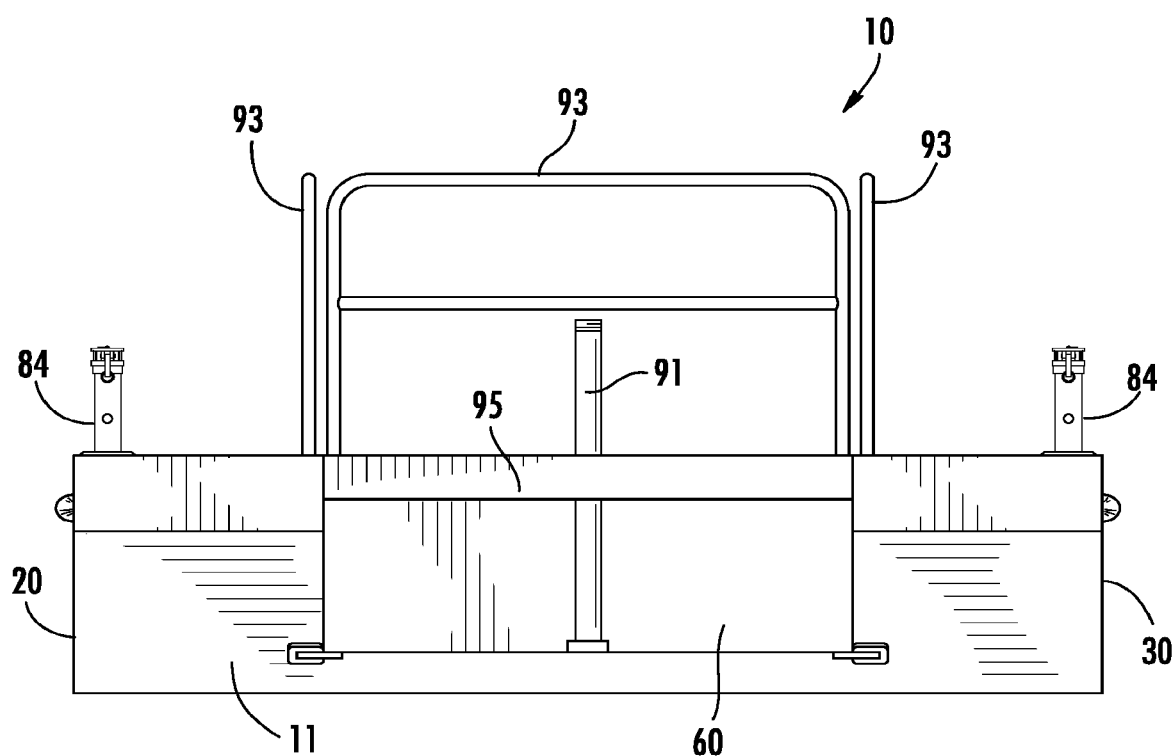
FIG. 1 is a front view of an embodiment of the apparatus of the present invention.
Figure 2:
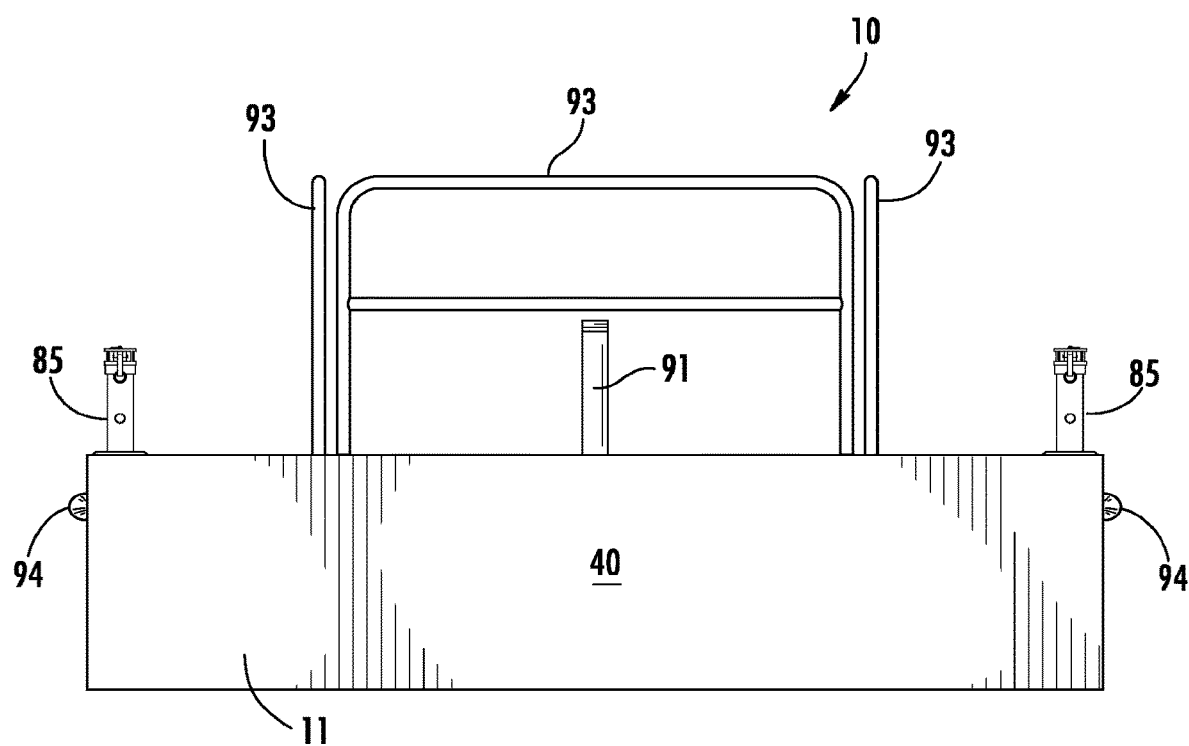
FIG. 2 is a rear view of an embodiment of the apparatus of the present invention.
Figure 3:
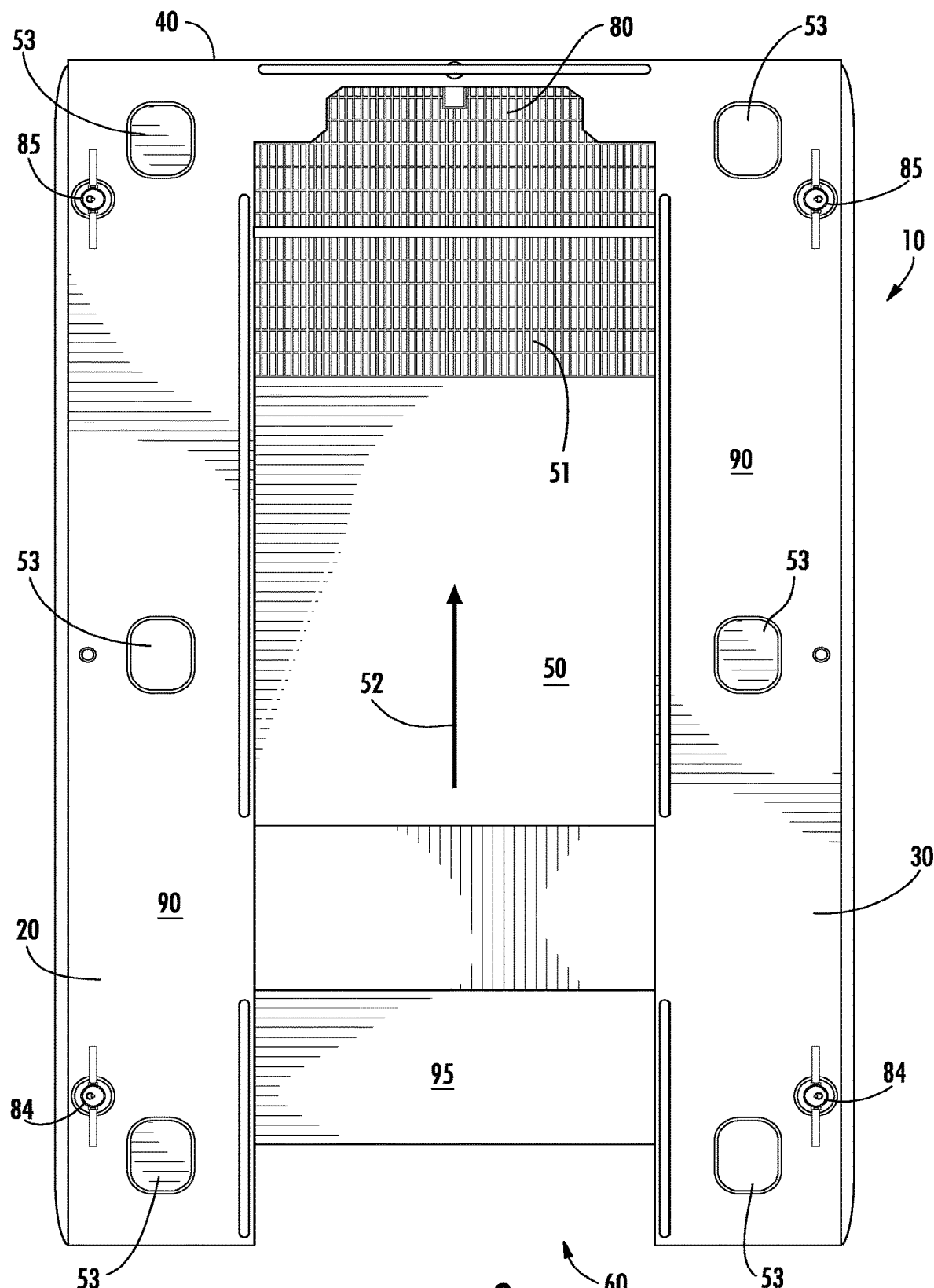
FIG. 3 is a top view of an embodiment of the apparatus of the present invention.
Figure 4:
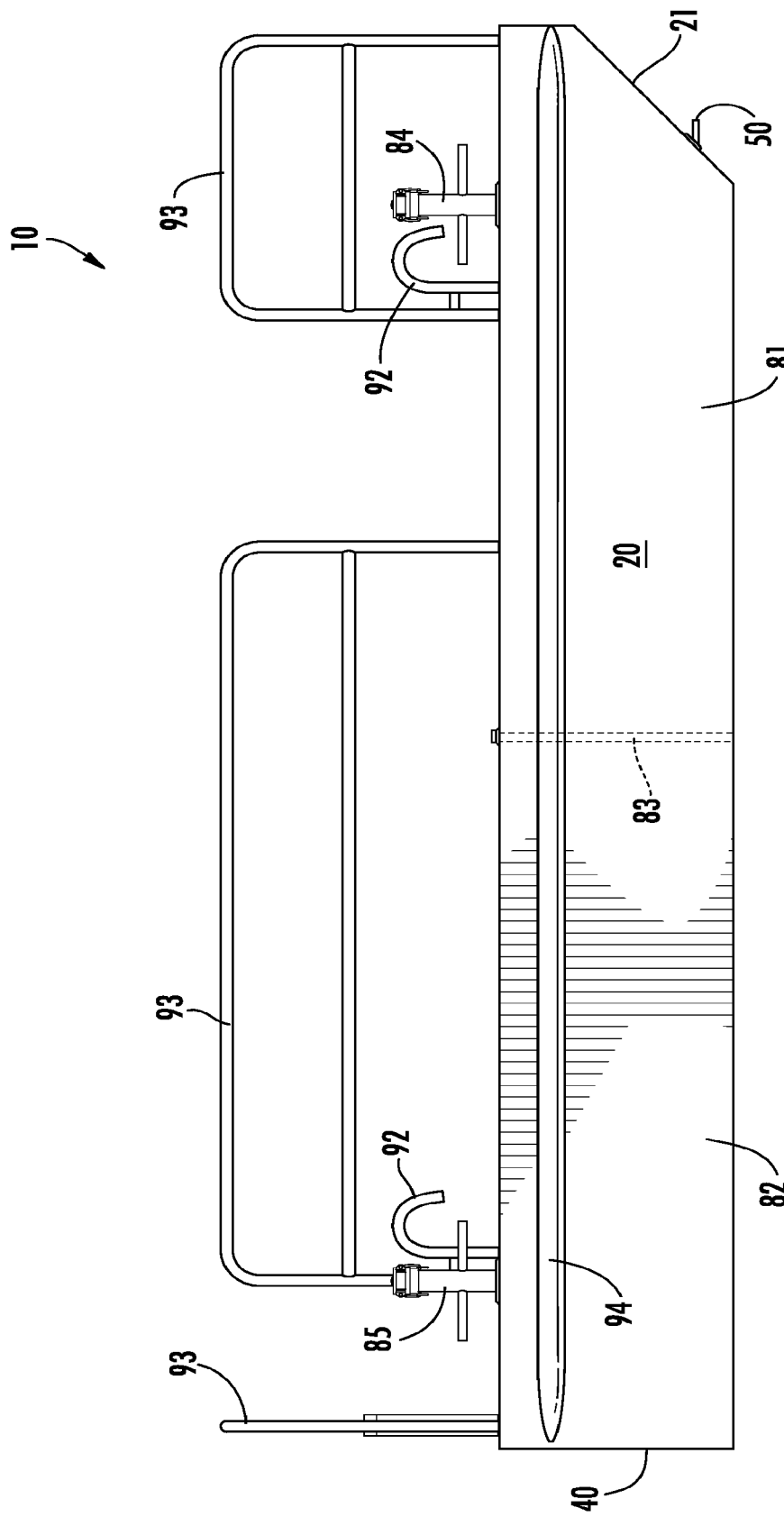
FIG. 4 is a right side view of an embodiment of the apparatus of the present invention.
Figure 5:
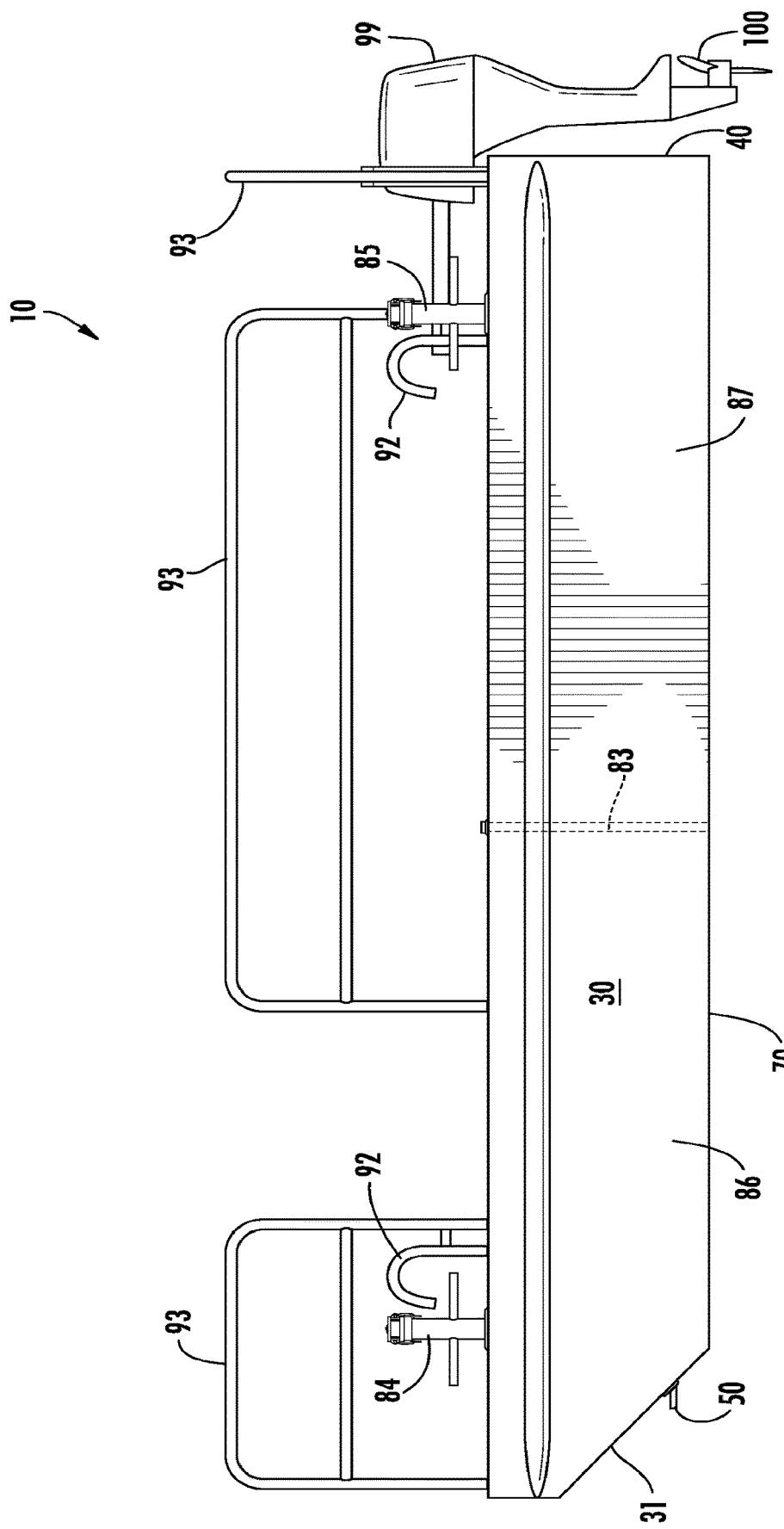
FIG. 5 is a left side view of an embodiment of the apparatus of the present invention.
Figure 6:
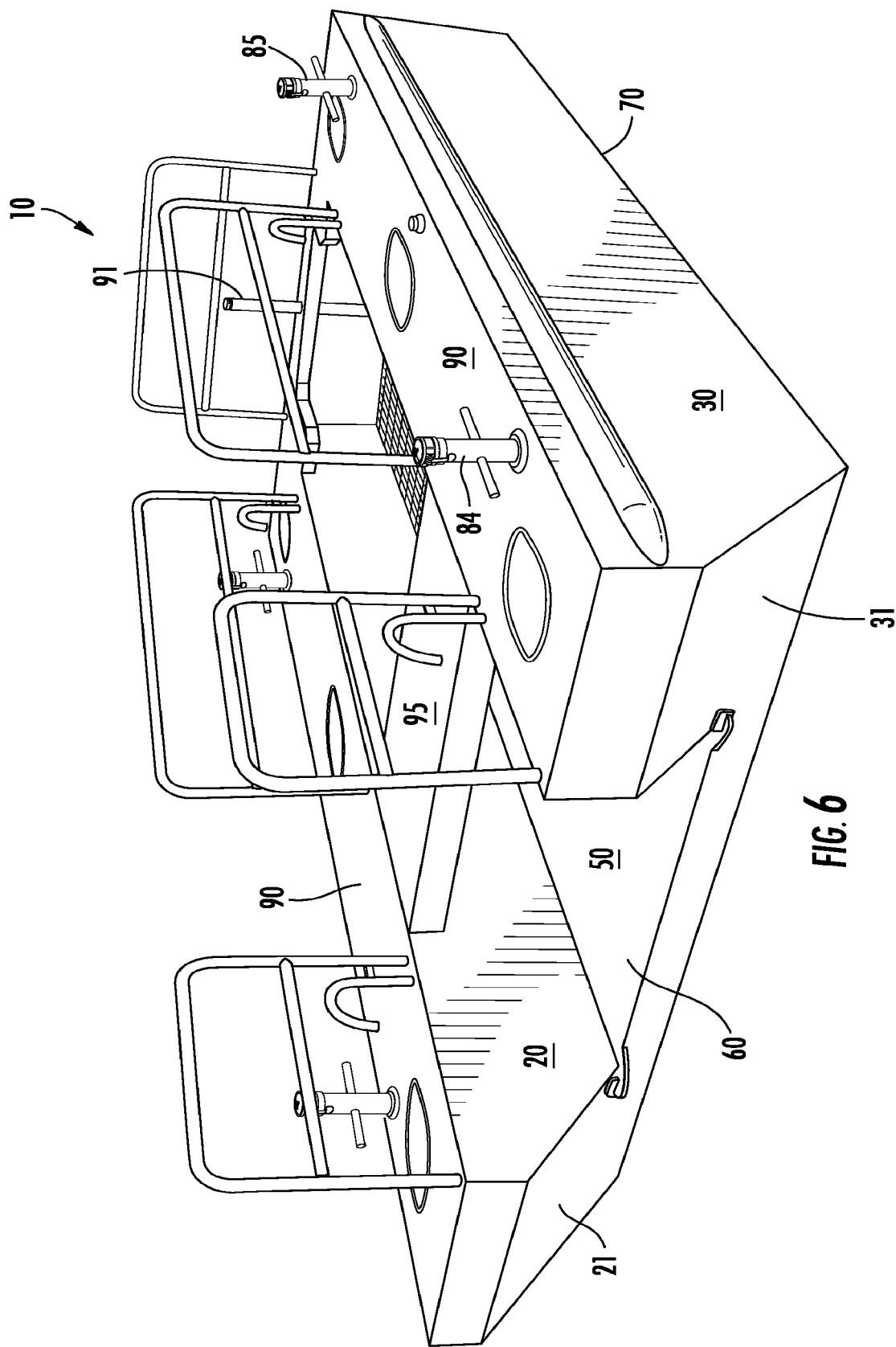
FIG. 6 is a perspective view of an embodiment of the apparatus of the present invention.
Figure 7:
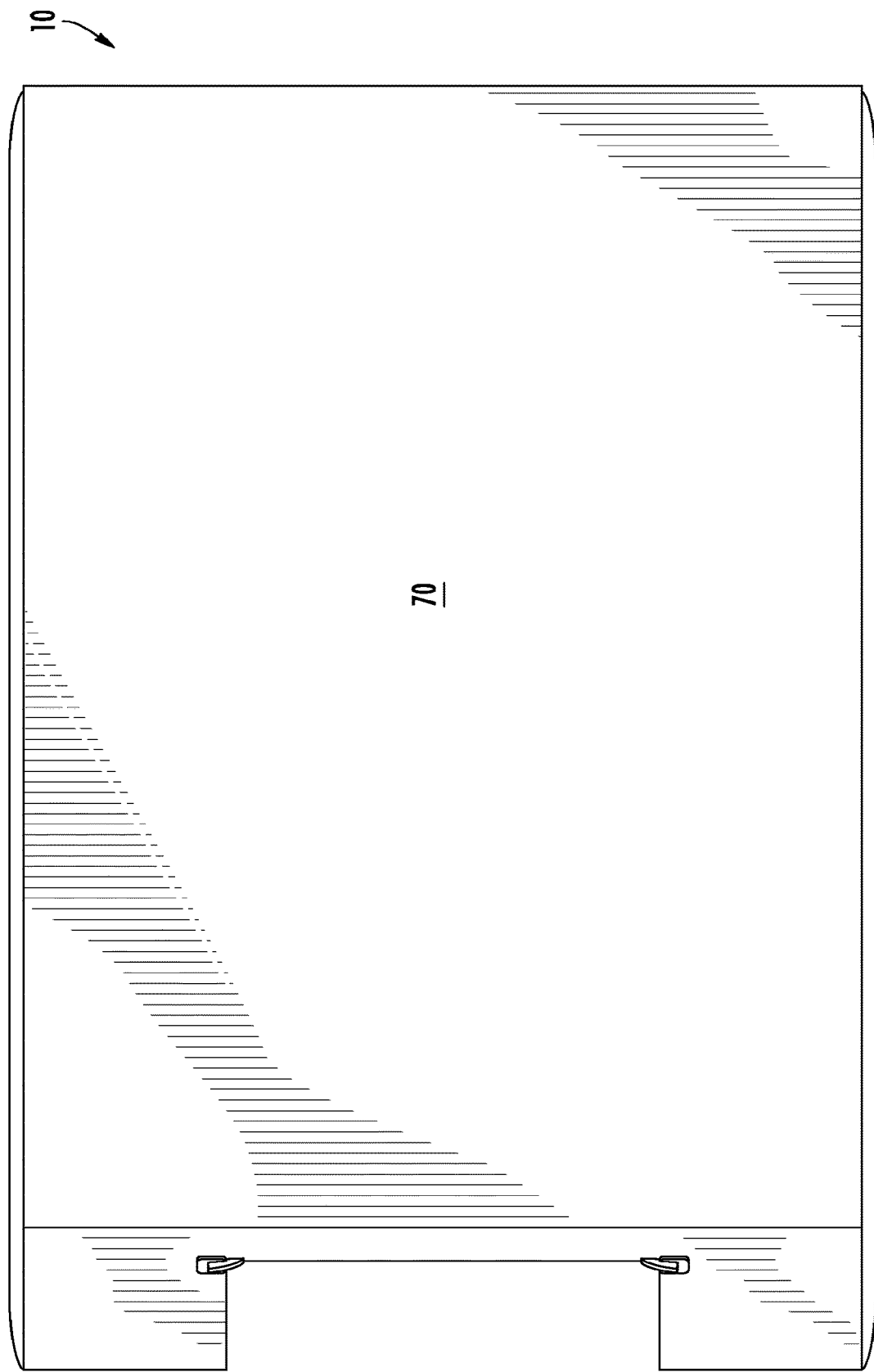
FIG. 7 is a bottom view of an embodiment of the apparatus of the present invention.
Figure 8:
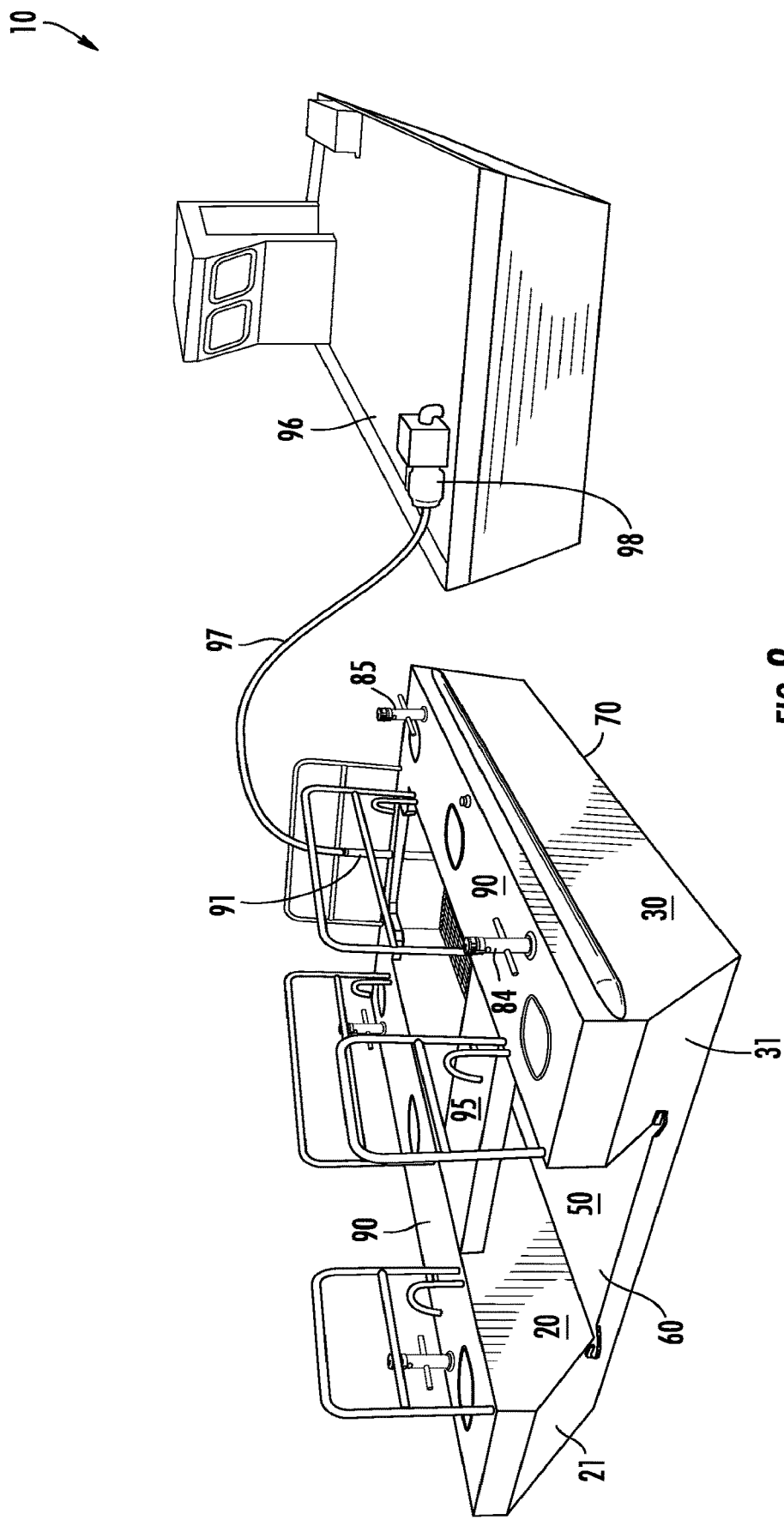
FIG. 8 is a perspective view of an embodiment of the apparatus of the present invention.
Figure 9:
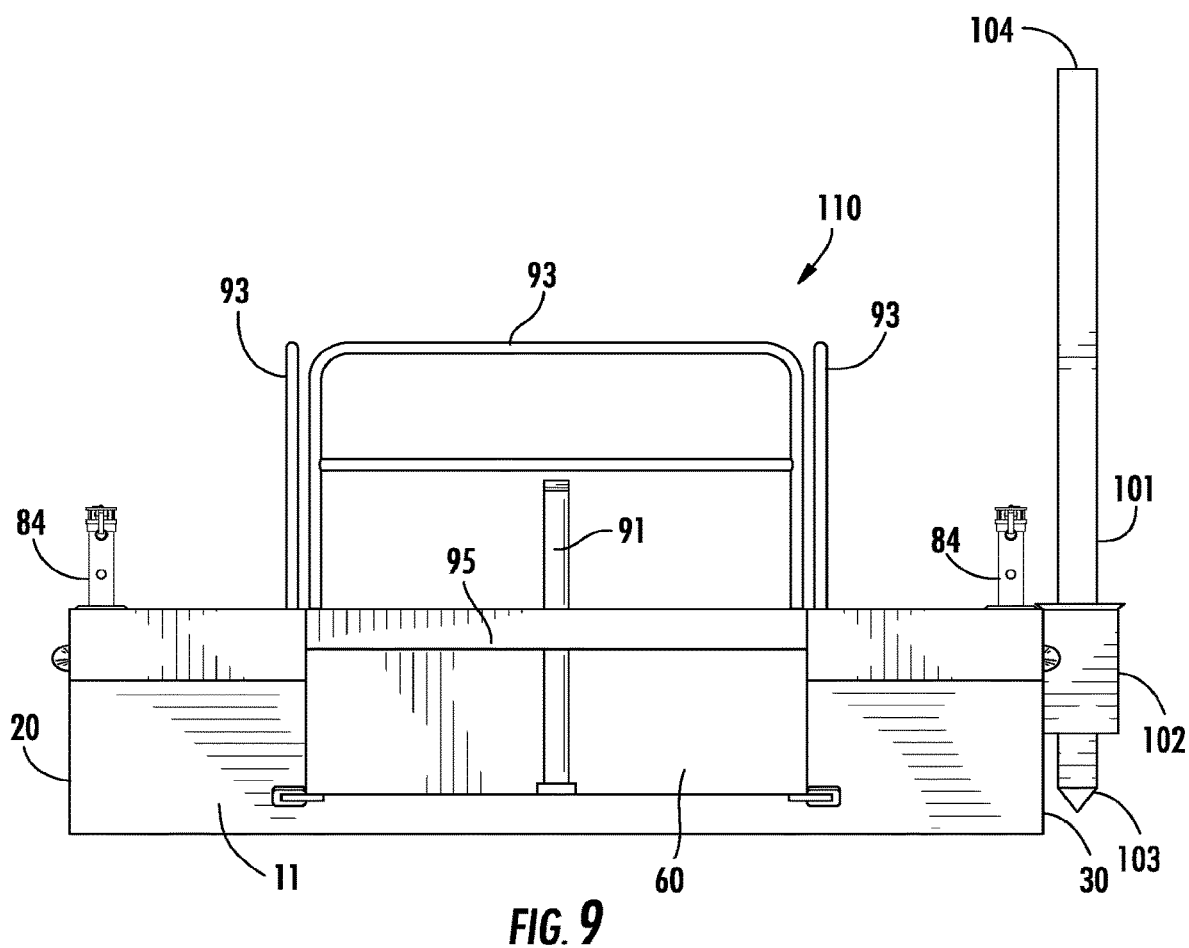
FIG. 9 is a front view of a preferred embodiment of the apparatus of the present invention.
Figure 10:
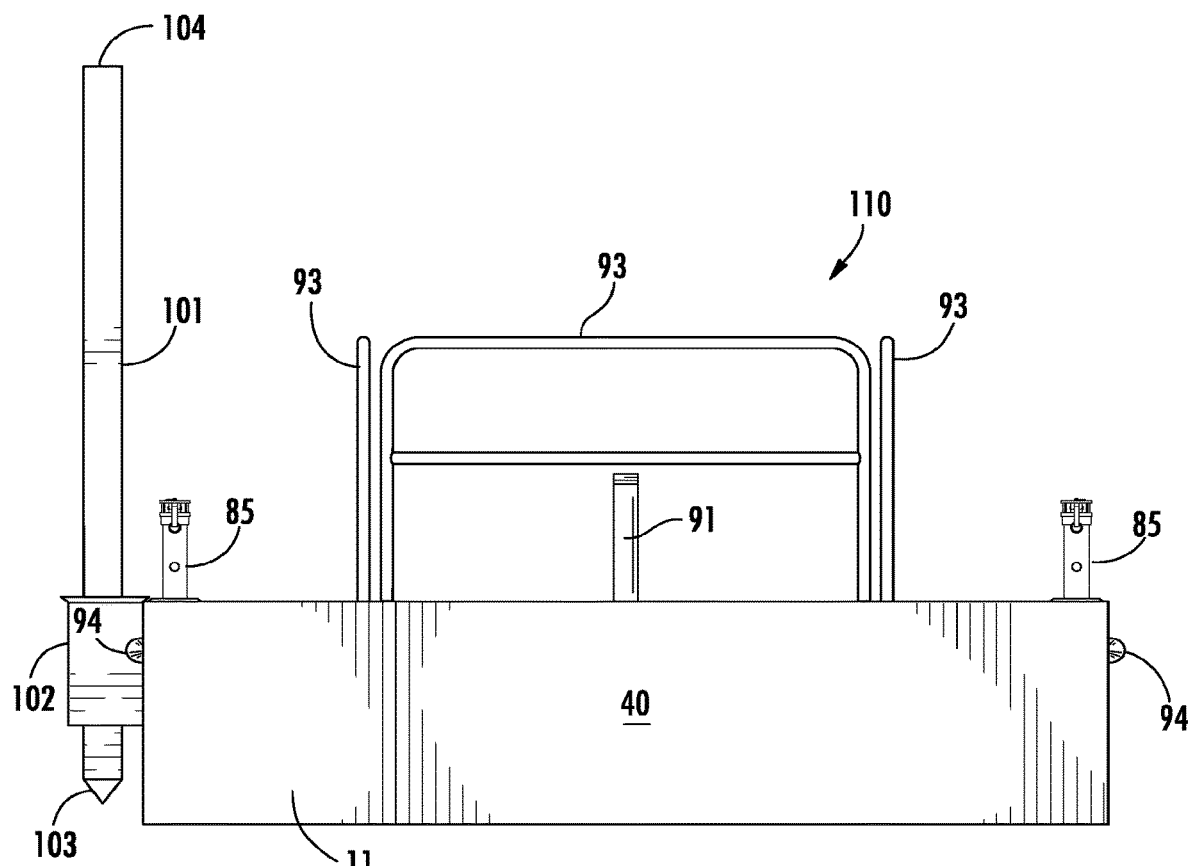
FIG. 10 is a rear view of a preferred embodiment of the apparatus of the present invention.
Figure 11:
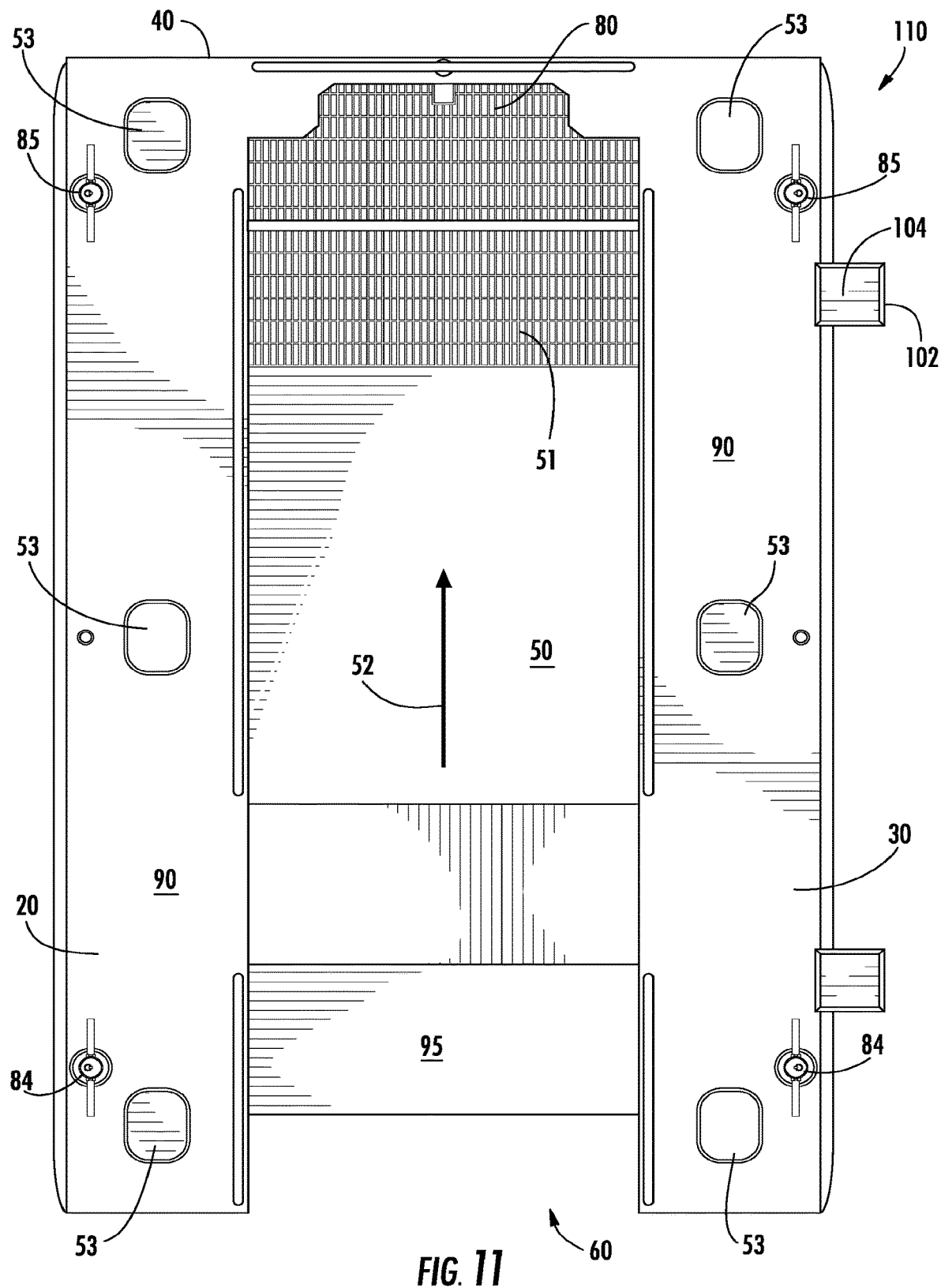
FIG. 11 is a top view of a preferred embodiment of the apparatus of the present invention.
Figure 12:
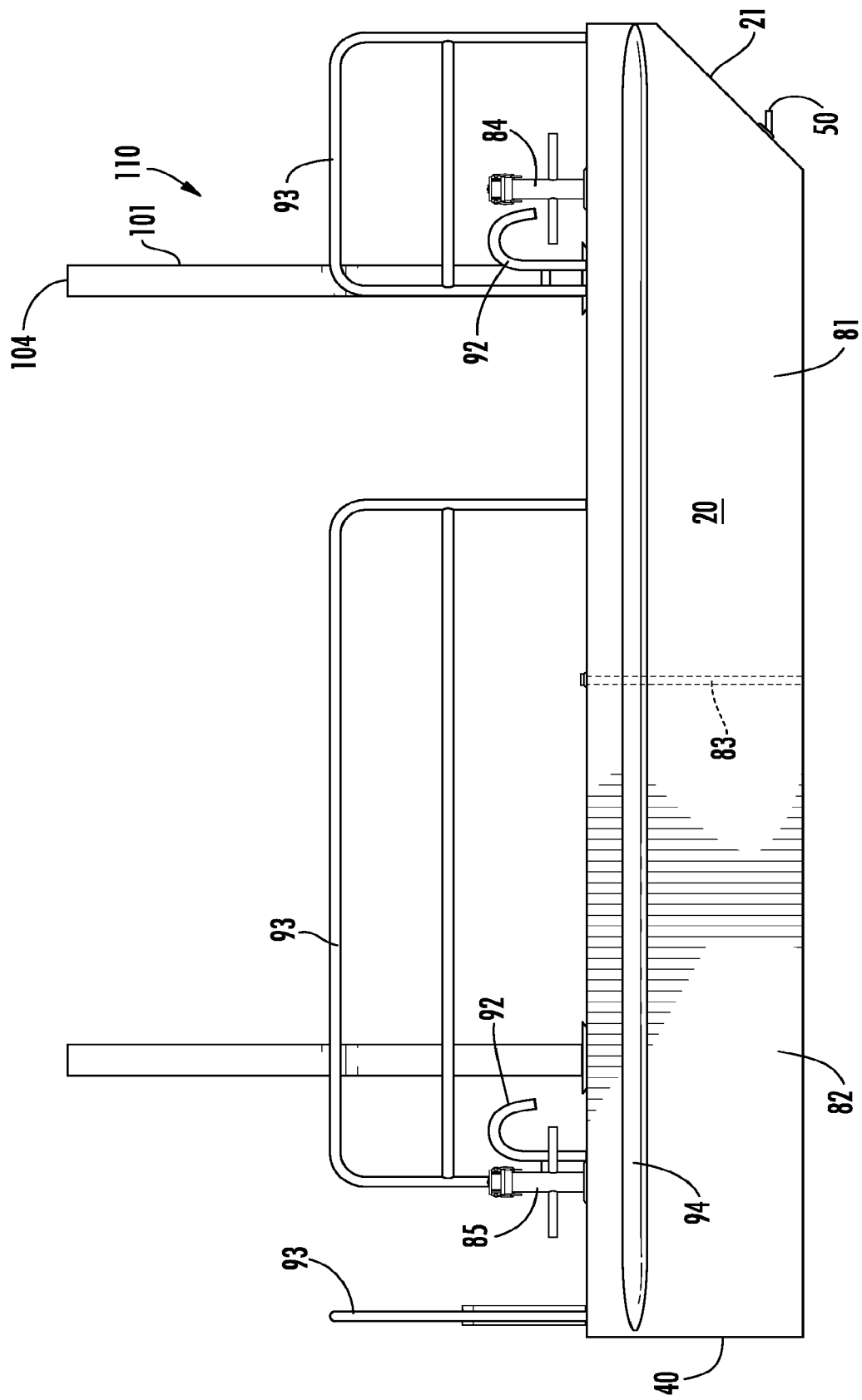
FIG. 12 is a right side view of a preferred embodiment of the apparatus of the present invention.
Figure 13:
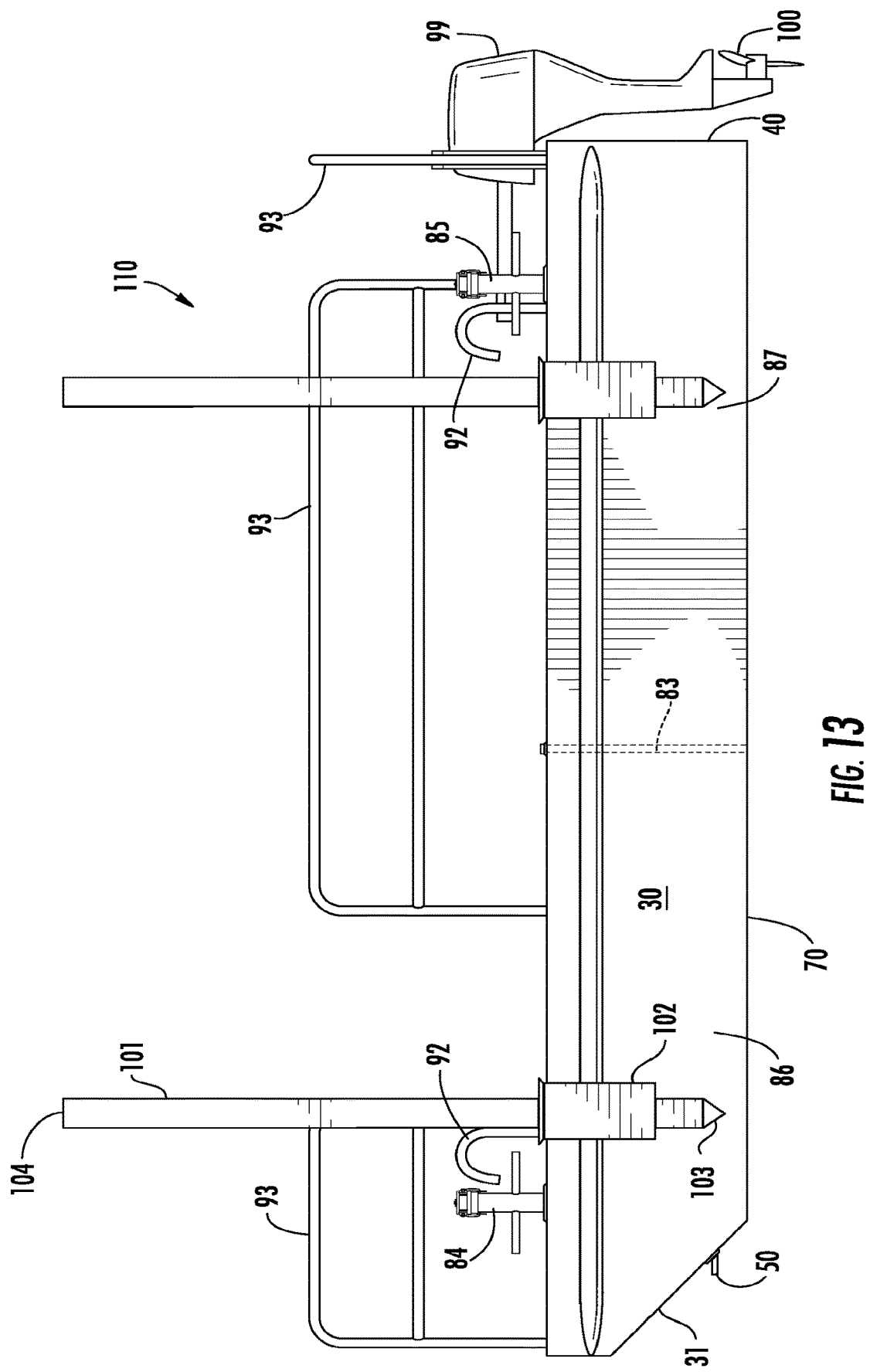
FIG. 13 is a left side view of a preferred embodiment of the apparatus of the present invention.
Figure 14:
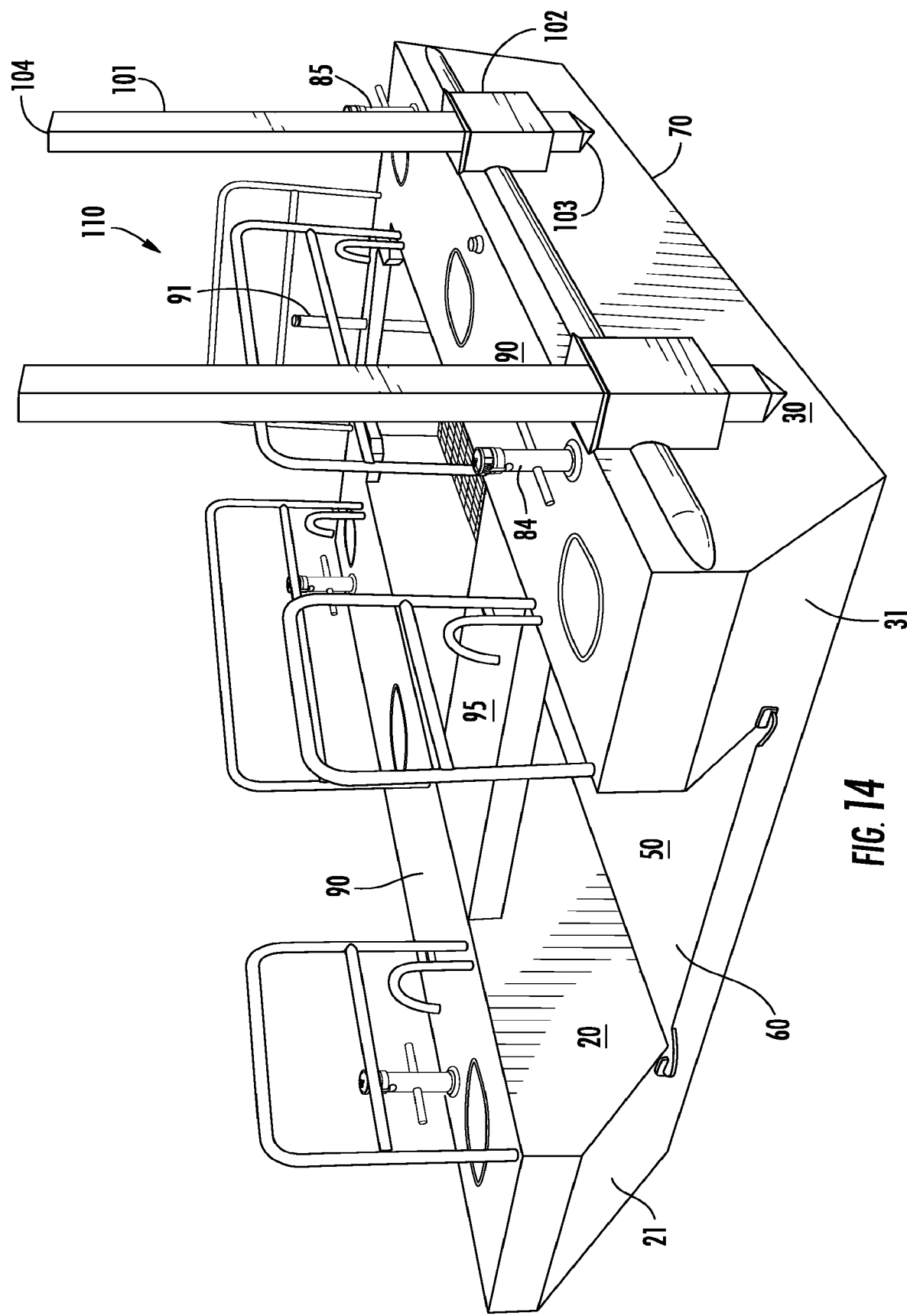
FIG. 14 is a perspective view of a preferred embodiment of the apparatus of the present invention.
Figure 15:
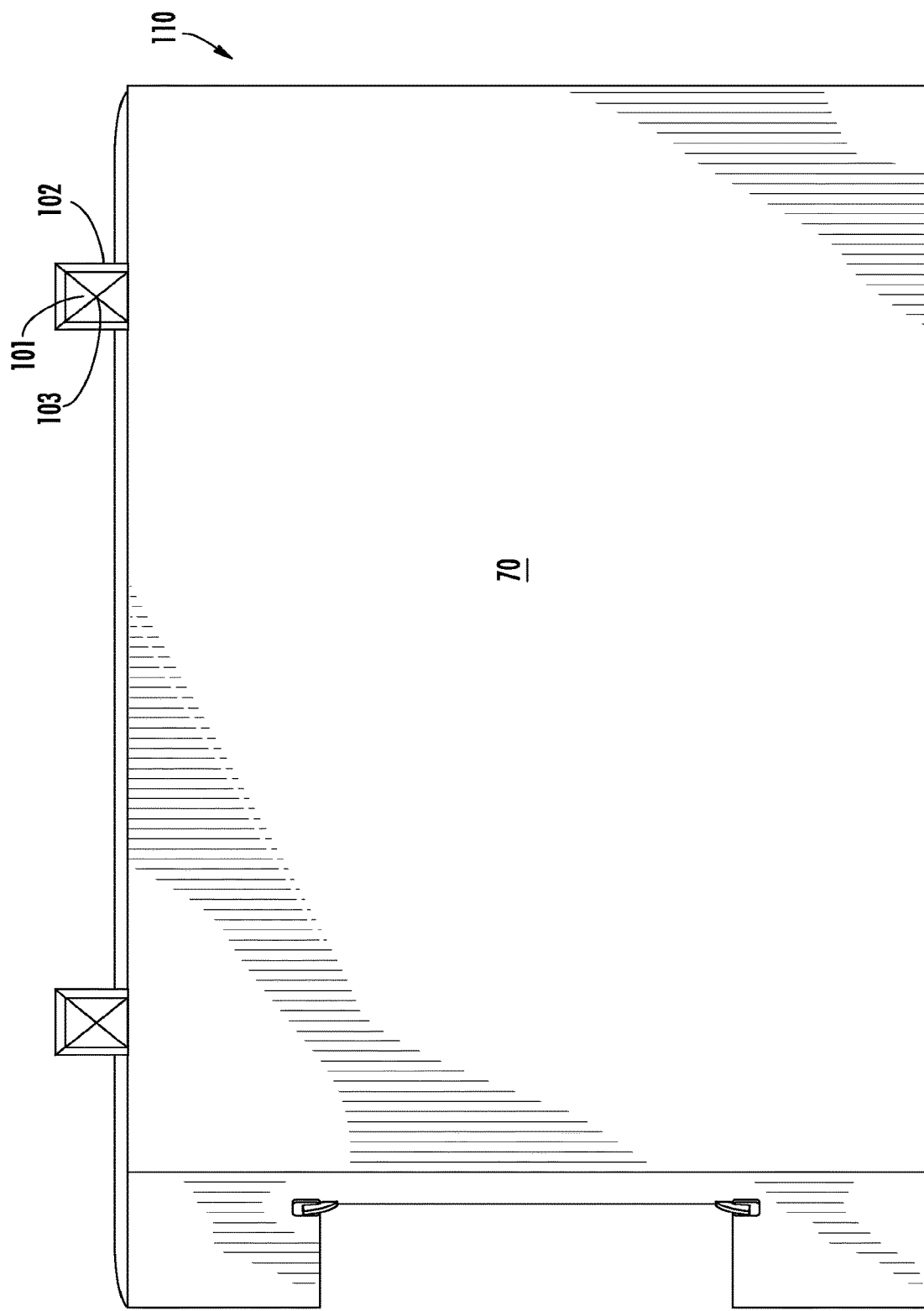
FIG. 15 is a bottom view of a preferred embodiment of the apparatus of the present invention.

An embodiment of the apparatus of the present invention is shown in FIGS. 1-8. The skimmer 10 of the present invention is a barge-style device for collecting oil or other pollutants from a water surface. The skimmer 10 can float right below the surface of the water. The skimmer can operate as a free standing vessel and does not need to be mounted to another vessel for operation. The skimmer of the present invention includes a right side wall/pontoon 20, a left side wall/pontoon 30, a rear wall 40, a floor 50 and a front opening 60. The floor of the skimmer is unobstructed. Floor 50 near opening 60 can be the same height as the part of floor 50 near the rear wall 40. The skimmer 10 has a bottom 70 as seen in FIG. 4-6. The bottom 70 can be flat. Side walls/pontoons 20, 30 are angled at the ends 21, 31 closest to the front opening 60. The floor 50 extends from the front opening 60 to the rear wall 40. Side walls/pontoons can have bumpers 94 on the outside portion of the each wall 20, 30. The body of the skimmer 10 can be one piece, without any moveable parts.

The top of side walls/pontoons 20, 30 can have surface 90, on which a user can stand or sit and monitor the use of the skimmer 10. Railings 93 are attached onto surface 90 and can surround the skimmer floor. Railings 93 assist a user to move about the skimmer vessel during monitoring its use. Bridge 95 can be connected to surface 90 above and across the skimmer floor so that it does not interfere with the flow of oil into the skimmer. Access panels 53 can be located on surface 90 so that a user can access the interior of the skimmer and ballast tanks if necessary.

The skimmer has ballasts tanks 81, 82, 86, 87 that can be contained in body 11 of skimmer. The ballast tanks 81, 82, 86, 87 can sit on either side 20, 30 of the skimmer vessel so that the front opening 60 of the skimmer vessel can be adjusted to sit below the water surface at the level of the oil. Ballast tanks 81, 86 can be included in the front of pontoons 20, 30. Ballast tanks 82, 87 can be included in the rear of pontoon 20, 30. A wall 83 separates the front ballast tank 81, 86 from the rear ballast tank 82, 87. The wall 83 is preferably located in the middle of each pontoon. Optionally, the wall 83 can be located at any location in the pontoon 20, 30. This wall 83 allows slightly more water to be put in the rear tanks to cause the oil to more easily flow toward the back.

Figure 16:
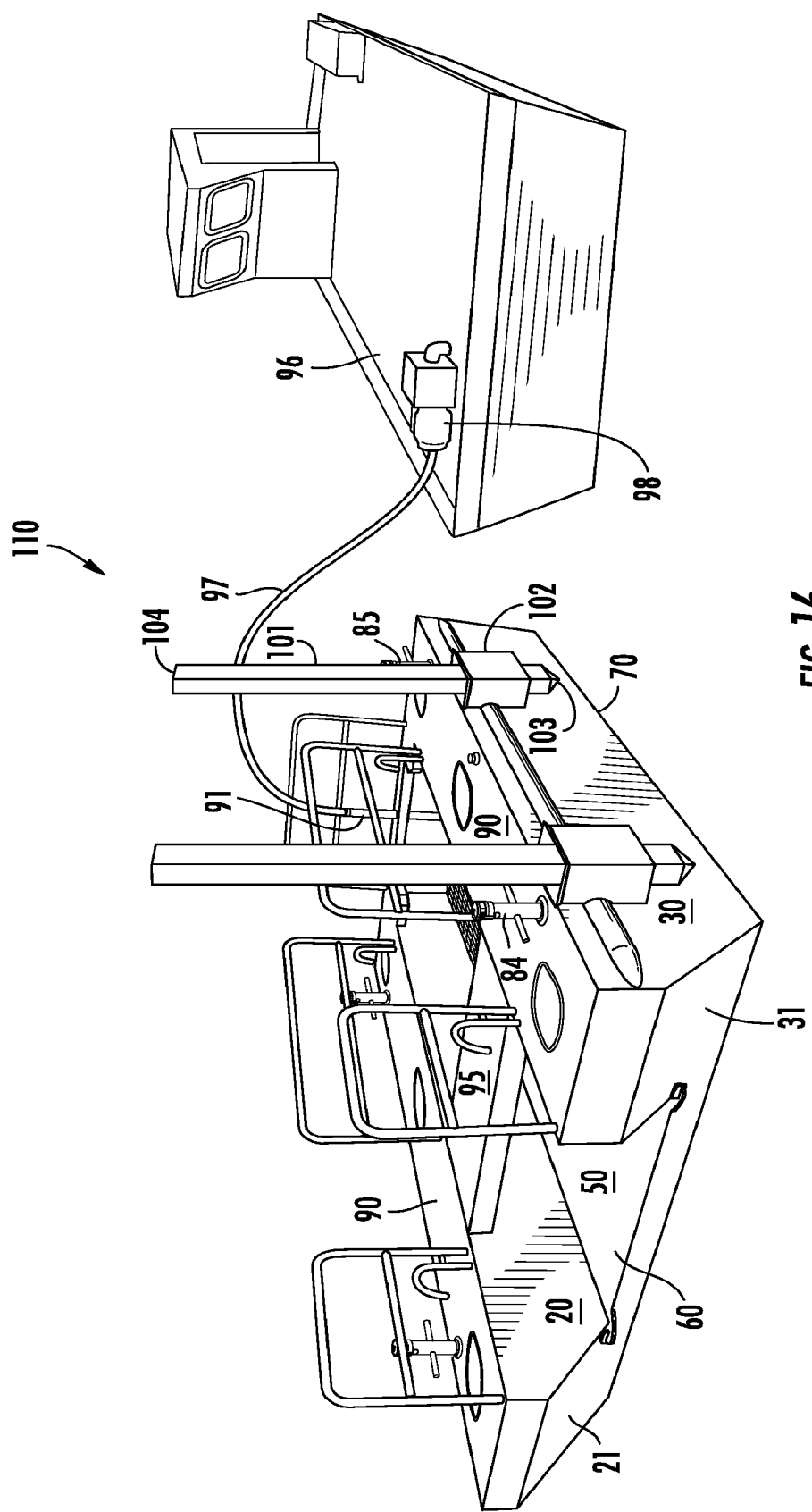
FIG. 16 is a perspective view of a preferred embodiment of the apparatus of the present invention.
Figure 17:
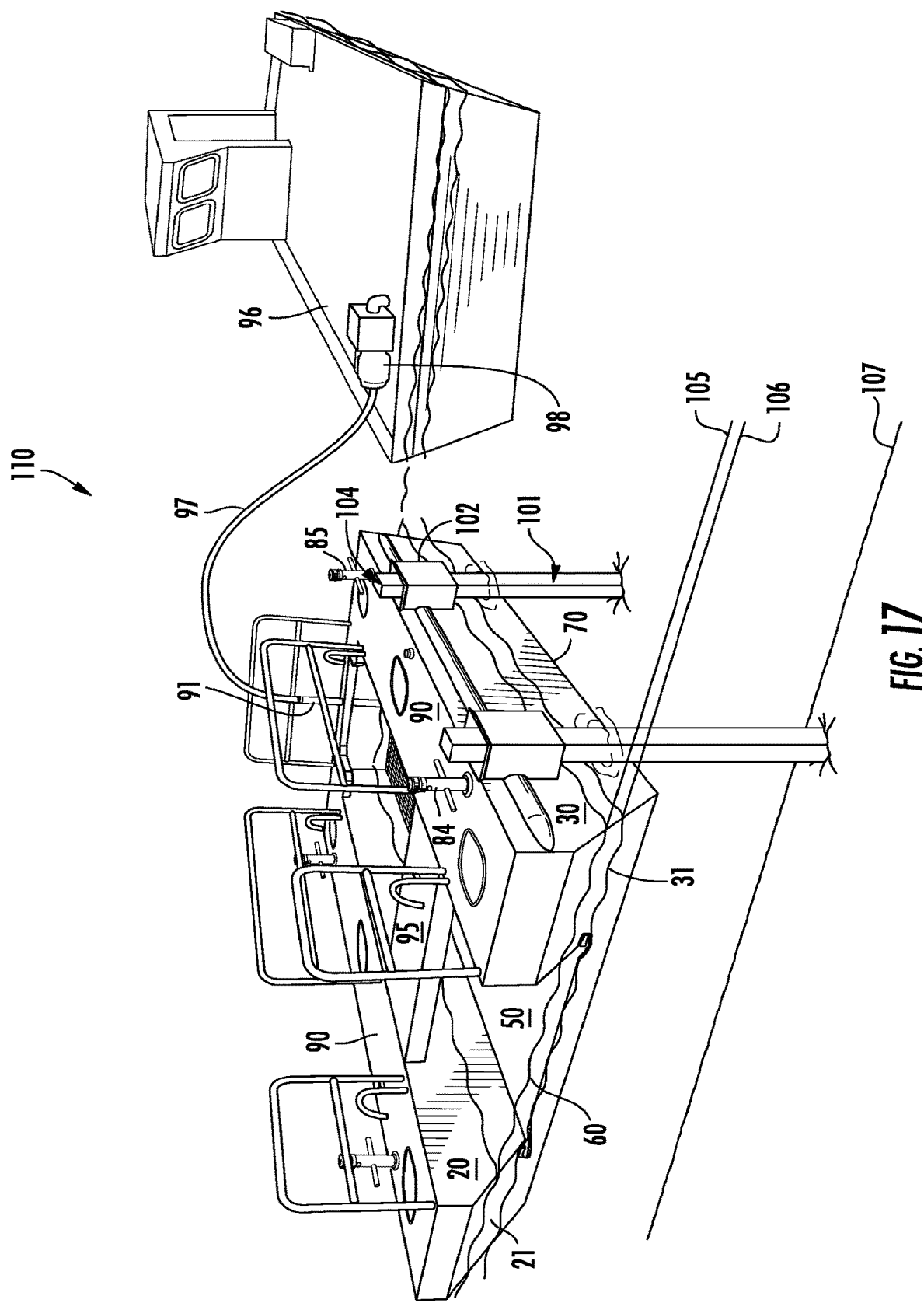
FIG. 17 is a perspective view of a preferred embodiment of the apparatus of the present invention with the spuds in mud.

FIG. 17 is similar to FIG. 16, but show spuds in the mud in about 5 feet of water, with vessel 110 at a slight tilt to back, showing the water line and oil line and the floor 50 at the front opening 60 at the oil/water interface (one adjusts the floor 50 at the front opening 60 to be at the interface by adjusting the ballast in the ballast tanks).

Inlets 84, 85 can be located on surface 90 of the skimmer apparatus. Front inlets 84 allow water to be added to the front ballast tanks 81, 86. Rear inlets 85 allow water to be added to the rear ballast tanks 82, 87. Vents 92 can be located on surface 90 and at the front and rear of each pontoon 20, 30. Vents 92 allow air to escape from the top of the ballast tank and be replaced by water entering through the ballast tank inlets 84, 85. The ballast tanks adjust the depth of the skimmer floor 50 into the oil and water so that the floor 50 sits at the interface of the oil and water. The platform floor is about one (1) to three (3) inches below the oil on the water surface, or variable to consistency of oil or pollutant floating on water surface. A storage vessel or barge 96 is connected to the skimmer 10 and holds all of the oil collected by the skimmer. During use, a user does not need to continually adjust the ballasts as the skimmer elevation does not change since the storage vessel/barge increases in weight due to the oil it picks up. The tanks are preferably ballasted so that the rear of the skimmer is preferably a little lower in elevation than the front of the skimmer.

The skimmer vessel can work stationary in the water, and does not require a propeller or pulling means for operation, as the oil will continue to flow into the skimmer as the oil is pumped out of the rear by the gravity flow to the rear of the vessel. The storage vessel or barge 96 can also be stationary with the skimmer vessel 10 while the barge pumps the oil from the skimmer vessel to the barge 96. The skimmer 10 can be self-propelled through a body of water with oil or other pollutants by the use of a propulsion device, preferably propellers, attached to the body 11 of the skimmer 10. Optionally, an outboard motor 99 with a propeller 100 or a hydraulic propeller can be attached to the skimmer. The skimmer can also be pushed with a small boat to direct it through the water.

When the skimmer floor 50 is at a desired level in the oil and water, oil flows into the front opening 60 onto the skimmer floor 50. The oil then moves across the floor 50 toward the rear wall 40, where the oil enters a rear location 80. The oil passes over grating 51 which can be located near rear wall 40. Grating 51 assists with preventing large debris from entering the rear location 80. The direction of the oil flow is indicated by arrow 52 in FIG. 3. The rear location 80 is preferably a box or tank. The box or tank 80 is a collection area that can sit at a lower elevation than the skimmer floor 50 intake so that the oil flows from the floor 50 into the rear location 80. Once the oil enters the rear location 80, it moves from the rear location 80 to a storage area/barge 96 via a suction pipe 91, hose 97 and hydraulic pump 98. The suction pipe 91 can be adjustable. The suction pipe 91 attaches from the rear location/tank 80 and discharges the collected oil through a hose 97 to a storage area 96, such as a barge or second vessel that can be situated close to the skimmer vessel, such as for example behind the skimmer (see FIG. 8). The hydraulic pump 98 is connected to the hose 97 on the storage vessel 96. Optionally, the hydraulic pump can be connected to the hose on the skimmer apparatus 10.

The storage vessel or barge 96 can be 12 feet wide×4 feet high×20 feet long with a capacity of 7,000 Gallons to 30 feet wide×8 feet high×120 feet long with a capacity of 168,300 Gallons. Ranges of dimensions for the skimmer 10 can be 12-30 feet wide by 20-120 feet long by 4-8 feet high; for example, skimmer 10 can be 12 feet wide by 4 feet high, by 20 feet long, or any multiple size thereof. The storage vessel or barge has a capacity of 7,000-168,300 gallons, for example 7,000 gallons, or any multiple size thereof of oil or other pollutant.

Experimental results have shown about 95% oil pick up.

The skimmer 10 can be made of aluminum or steel. Exemplary dimensions of the skimmer 10 can be 12-36 feet wide by 20-60 feet long by 3-7 feet high, for example 12 feet wide by 20 feet long by 3 feet high or any multiple size thereof. Skimmer 10 can be sized up or down as desired or appropriate for a particular job.

While preferably the skimmer is self propelled, it can also be stationary and oil can feed into the box 80 via gravity alone when the front opening 60 is positioned at the oil water interface.

FIGS. 9-16 show a preferred embodiment of the skimmer 110 which includes a spud 101 with a lower pointed end 103 and an upper end and a spud sleeve 102 for receiving and positioning the spud 101. The combination of the spud 101 and spud sleeve 102 preferably serve to stabilize the skimmer 110. The spud sleeve 102 is preferably attached to the skimmer 110 and is preferably able to receive and position the spud 101, wherein the spud 101 is horizontally fixed in a single position and is able to move vertically relative to that single position. The spud sleeve 102 is preferably made of aluminum, steel, or any other durable material. The spud 101 is preferably square in shape and is preferably made of aluminum, steel, or any other durable material. Exemplary dimensions of spud 101 can be 6-8 inches wide by 6-8 inches long by 8-14 feet high, or any other suitable length for the conditions. The spud 101 preferably includes a lower pointed end 103 for enhancing the pressure to drive the spud through a floor surface by reducing contact area between the pointed end 103 and the floor surface. To stabilize the skimmer 110, the spud 101 that has been received and positioned by the spud sleeve 102 attached to the skimmer 110 can be preferably lowered vertically from a first position to a second position. In the first position, the lower pointed end 103 of the spud 101 has preferably not made contact with the floor surface. In the second position, the lower pointed end 103 of the spud 101 has preferably reached and penetrated the floor surface. Once the floor surface has been penetrated, the spud 101 is preferably affixed to the floor surface. To reverse the stabilization, the spud 101 that has been received and positioned by the spud sleeve 102 attached to the skimmer 110 can be preferably raised from the second position to the first position.

PARTS LIST

The following is a list of suitable parts and materials for the various elements of the preferred embodiment of the present invention.

| Parts Number | Description |
|---|---|
| 10 | skimmer |
| 11 | skimmer body |
| 20 | right side wall |
| 21 | end |
| 30 | left side wall |
| 31 | end |
| 40 | rear wall |
| 50 | floor |
| 51 | grating |
| 52 | arrow |
| 53 | access panel |
| 60 | front opening |
| 70 | bottom |

-continued

| Parts Number | Description |
| --- | --- |
| 80 | rear location |
| 81 | front ballast tank |
| 82 | rear ballast tank |
| 83 | wall |
| 84 | front ballast inlet |
| 85 | rear ballast inlet |
| 86 | front ballast tank |
| 87 | rear ballast tank |
| 90 | surface |
| 91 | suction pipe |
| 92 | vent |
| 93 | railing |
| 94 | bumper |
| 95 | bridge |
| 96 | barge |
| 97 | hose |
| 98 | pump |
| 99 | outboard motor |
| 100 | propeller |
| 101 | spud |
| 102 | spud sleeve |
| 103 | lower pointed end of spud |
| 104 | upper end of spud |
| 105 | oil line (upper) |
| 106 | oil/water interface |
| 107 | mud line |
| 110 | skimmer |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An apparatus for removing oil or other pollutants from a surface of water, comprising:
   a) a floating platform having an overall length, a pair of spaced apart pontoons including a port side pontoon having an inner side wall and an outer side wall, a starboard pontoon having an inner side wall and an outer side wall, each said pontoon having a pontoon bow end portion and a pontoon stern end portion;
   b) the platform having a bow, a stern, a rear wall, a floor having a leading edge, a bottom and an oil intake front opening that is in between the pontoon inner walls at said bow, said oil intake front opening having a width, and wherein said floor extends from said oil intake front opening and terminating at said stern in front of the rear wall;
   c) each pontoon having one or more internal ballast tanks which enable adjustment of the platform floor relative to a level of oil on the water surface;
   d) wherein a passage enables oil flow from the front opening across the floor to the rear wall;
   e) a rear collection tank positioned in between said pontoons and extending in front of the pontoon stern end portions to collect the oil that flows from the intake opening to the rear wall;
   f) wherein the floor extends from the intake opening and the leading edge over a majority of the platform overall length to said rear collection tank;
   g) wherein said rear wall connects to the stern end portions of said pontoons and to said floor to form a closed end portion at said stern that traps oil in between the pontoons and in front of the rear wall;
   h) the rear collection tank having an oil intake that is in between said pontoon inner walls and in front of said rear wall;
   i) a pump connected to the rear collection tank that removes the oil from the rear collection tank to a storage area which does not affect the ballast tanks of the platform;
   j) port and starboard spuds;
   k) port and starboard spud sleeves for receiving and positioning the spuds onto the platform, said spud sleeves mounted on said outer side walls on opposing sides of said platform; and
   l) each spud sleeve being spaced laterally away from said passage so that neither the spuds nor spud sleeves restricts oil flow in said passage.

2. The apparatus of claim 1, wherein in step "b" the platform floor is about one to three inches below the oil on the water surface.

3. The apparatus of claim 1, wherein in step "b" the platform floor floats right below the surface of the oil.

4. The apparatus of claim 1, wherein there are two internal ballast tanks located in each of the pontoons.

5. The apparatus of claim 1, wherein the pump is a hydraulic pump.

6. The apparatus of claim 1, wherein the rear collection tank sits at a lower elevation than the floor.

7. The apparatus of claim 1, wherein the floor is unobstructed.

8. The apparatus of claim 1, wherein the bottom is flat.

9. The apparatus of claim 1, wherein the platform floor has a level which is variable.

10. The apparatus of claim 1, further comprising one or more propellers attached to the platform to self propel the platform through water.

11. The apparatus of claim 1, further comprising a second vessel in which the oil is contained.

12. An apparatus for removing oil or other pollutants from a water surface, comprising:
   a) a floating platform having an overall length, a bow end, a stern end, spaced apart pontoons including a left pontoon with a left inner side wall, a left outer side wall, and a left pontoon stern end, a right pontoon with a right inner side wall, a right outer side wall, and a right pontoon stern end, further comprising a distance between the pontoon inner side walls;
   b) said floating platform having a rear wall, an intake front opening, a platform floor, and a bottom;
   c) each pontoon having an interior with one or more ballast tanks which adjust the platform floor relative to a level of oil on the water surface;
   d) said pontoons each having a front end portion at the bow end and a stern end portion at said pontoon stern ends, wherein said rear wall connects to the stern end portions of said pontoons and to said floor to form a closed end portion at said stern end that traps oil in between the pontoons and in front of the rear wall;
   e) wherein the platform floor has a forward edge at said bow end, said forward edge having an elevation, a rear edge having an elevation, the elevation of the said forward and rear edges being adjustable with said ballast tanks to define an oil intake elevation so that the oil flows from the front opening at said forward edge and across the floor to the rear edge;
   f) a rear holding tank at said stern end that extends downwardly below the floor, said tank positioned in front of the rear wall and said pontoon stern ends and in between the said inner side walls, wherein said tank collects oil that flows in a passage in between said left and right pontoon inner side walls from the intake front opening and across said platform floor;
g) a tank opening above the holding tank that receives flow from the intake front opening and floor, the tank opening extending a majority of the distance between the pontoon inner side walls;
h) a pumping unit that includes a flow line connected to the rear holding tank that moves the oil from the rear holding tank to a storage area that does not affect the one or more ballast tanks of each of the pontoons;
i) wherein each pontoon, the platform floor and the ballast tanks each extend over a majority of said overall length;
j) port and starboard spuds;
k) port and starboard spud sleeves for receiving and positioning the spuds onto the platform, said spud sleeves mounted on said outer side walls on opposing sides of said platform; and
l) each spud sleeve being spaced laterally away from said passage so that neither the spuds nor spud sleeves restrict oil flow in said passage.

13. The apparatus of claim 12, wherein the storage area includes a second vessel in which the oil is contained.

14. The apparatus of claim 12, wherein the apparatus is self-propelled.

15. An apparatus for removing oil or other pollutants from the surface of water, comprising:
a) a floating platform having a platform overall length, a bow end, a stern end, and a pair of spaced apart pontoons, one pontoon being a left pontoon having a left side inner wall, an outer side wall, and a left pontoon stern end, the other pontoon being a right pontoon having a right side inner wall, an outer side wall, and a right pontoon stern end;
b) said platform having a rear wall at the pontoon stern ends that connects to each of the side inner walls, a front oil intake opening having a width, a rectangular floor that connects to each of the side walls, said floor having a leading edge at the bow end, a rear edge, and the platform including a bottom spaced below the floor;
c) each pontoon having one or more ballast tanks which enable adjustment of the platform floor and the leading edge relative to a level of oil on the water surface;
d) a rear collection tank near the rear wall and extending in front of the pontoon stern ends to collect the oil that flows in a passage from the intake opening to the rear wall and across the leading edge and platform floor;
e) wherein the floor extends from the intake opening and leading edge to the rear edge and over a majority of the platform overall length;
f) wherein said rear wall connects to the stern ends of said pontoons and to said floor to form a closed end portion at said stern that traps oil in between the pontoons and in front of the rear wall;
g) the rear collection tank having a tank opening in between the pontoon inner side walls and in front of said rear wall; and
h) a pump connected to the rear collection tank that moves the oil from the said collection tank to a storage area which does not affect the one or more ballast tanks of each of the pontoons, wherein when the front opening and leading edge are below the surface of the oil, wherein oil flows from the front oil intake opening and leading edge across the floor to the rear wall;
i) port and starboard spuds;
j) port and starboard spud sleeves for receiving and positioning the spuds onto the platform, said spud sleeves mounted on said outer side walls on opposing sides of said platform; and
k) each spud sleeve being spaced laterally away from said oil intake opening so that neither the spuds nor spud sleeves restricts oil flow in said passage.

16. The apparatus of claim 15, wherein the platform floor is approximately at an interface of the oil and water.

17. The apparatus of claim 15, wherein the platform floor floats immediately adjacent the lower surface of the oil.

18. The apparatus of claim 15, wherein the one or more ballasts are located in between said inner side wall and said outer side wall of the pontoons.

19. The apparatus of claim 15, wherein the floor is unobstructed in between the leading edge and rear edge.

20. An apparatus for removing oil from a water surface, comprising:
a) a buoyant, movable vessel having an outer periphery that includes port and starboard outer sides, a stern having a stern wall, a port side pontoon having a port inner side wall and a port pontoon stern end, a starboard side pontoon having a starboard inner side wall and a starboard pontoon stern end, wherein there is a distance between the port inner side wall to the starboard inner side wall, a bow with an opening that extends from the port inner side wall to the starboard inner side wall, and a floor having an elevation, said floor connecting to each of said pontoons, said floor extending in between said port and starboard inner side walls, said floor having a floor area, wherein the inner side walls are generally parallel;
b) wherein the port side pontoon provides said port outer side and the starboard side pontoon provides the starboard outer side;
c) the vessel having one or more ballasts in the pontoons which enable adjustment of the elevation of the floor relative to a level of oil on the water surface so that oil flows in a flow stream over a majority of the floor area via the bow opening responsive to a forward movement of the vessel;
d) the floor having an oil collection intake positioned at the stern wall, said intake including a grating that extends at least half the distance from the port inner side wall to the starboard inner side wall, said oil collection intake extending in front of the pontoon stern ends;
e) a propulsion that moves the vessel forward, wherein forward movement toward the oil or other pollutants generates the flow stream that extends from the front opening to said stern across and above the floor and wherein said flow stream extends completely from the port inner side wall to the starboard inner side wall;
f) port and starboard spuds;
g) port and starboard spud sleeves for receiving and positioning the spuds onto the vessel, said spud sleeves mounted on said outer sides on opposing sides of said vessel; and
h) each spud sleeve being spaced laterally away from said flow stream so that neither the spuds nor spud sleeves restricts oil flow in said flow stream.

* * * * *